US012779980B2

(12) United States Patent
Mammeri et al.

(10) Patent No.: US 12,779,980 B2
(45) Date of Patent: Nov. 3, 2026

(54) COOLING MODULE FOR AN ELECTRIC OR HYBRID MOTOR VEHICLE, HAVING A TANGENTIAL-FLOW TURBOMACHINE

(71) Applicant: VALEO SYSTEMES THERMIQUES, La Verriere (FR)

(72) Inventors: Amrid Mammeri, La Verriere (FR); Kamel Azzouz, La Verriere (FR); Sebastien Garnier, La Verriere (FR); Issiaka Traore, La Verriere (FR)

(73) Assignee: Valeo Electrification, Cergy Pontoise (FR)

( * ) Notice: Subject to any disclaimer, the term of this patent is extended or adjusted under 35 U.S.C. 154(b) by 401 days.

(21) Appl. No.: 18/561,408

(22) PCT Filed: May 20, 2022

(86) PCT No.: PCT/EP2022/063702
§ 371 (c)(1),
(2) Date: Nov. 16, 2023

(87) PCT Pub. No.: WO2022/243503
PCT Pub. Date: Nov. 24, 2022

(65) Prior Publication Data
US 2024/0253452 A1 Aug. 1, 2024

(30) Foreign Application Priority Data
May 20, 2021 (FR) ....................................... 2105249

(51) Int. Cl.
*B60K 11/08* (2006.01)
*B60K 11/06* (2006.01)

(52) U.S. Cl.
CPC .............. *B60K 11/08* (2013.01); *B60K 11/06* (2013.01)

(58) Field of Classification Search
CPC ......... B60K 11/04; B60K 11/06; B60K 11/08; B60K 11/085; F01P 11/10; F01P 2050/24;
(Continued)

(56) References Cited

U.S. PATENT DOCUMENTS 6,766,774 B1 * 7/2004 Kussmann ............ F04D 29/582 123/41.12
11,635,014 B2 * 4/2023 Kim .......................... F01P 5/02 165/41
(Continued)

FOREIGN PATENT DOCUMENTS

CN 118613380 A * 9/2024 ............. B60K 11/08
CN 120187598 A * 6/2025 ........... B60K 11/085
(Continued)

OTHER PUBLICATIONS

European Patent Office, International Search Report (with English translation) and Written Opinion of corresponding International Application No. PCT/EP2022/063702, dated Sep. 13, 2022.

*Primary Examiner* — Jason C Smith
(74) *Attorney, Agent, or Firm* — Valeo Electrification

(57) ABSTRACT

Cooling module for a motor vehicle intended to be traversed by an airflow circulating between an air inlet and an air outlet and including: a fairing forming an internal duct that contains a heat exchanger and including a front face that contains the air inlet, —a collector housing designed to receive a turbomachine designed to generate the airflow, fastening elements arranged on both sides of the fairing and enabling the heat exchanger to be fastened to the cooling module, and enabling the module and the heat exchanger to be fastened to a chassis of the vehicle such that the front face of the fairing faces an underbody of the motor vehicle.

20 Claims, 2 Drawing Sheets

(58) Field of Classification Search
CPC ........ F01P 3/18; F01P 5/06; F01P 7/10; F04D 17/04
See application file for complete search history.

(56) References Cited

U.S. PATENT DOCUMENTS

| | | | | |
|---|---|---|---|---|
| 2002/0153125 | A1* | 10/2002 | Marton | F28D 1/0408 165/47 |
| 2008/0289796 | A1* | 11/2008 | Sasano | B60K 11/04 165/51 |
| 2017/0225560 | A1* | 8/2017 | Klop | G05D 3/125 |
| 2019/0126724 | A1 | 5/2019 | Spunar et al. | |
| 2022/0348072 | A1* | 11/2022 | Azzouz | F01P 5/06 |
| 2024/0218823 | A1* | 7/2024 | Mammeri | F01P 11/10 |
| 2024/0253452 | A1* | 8/2024 | Mammeri | B60K 11/04 |
| 2024/0351430 | A1* | 10/2024 | Mammeri | B60H 1/00542 |

FOREIGN PATENT DOCUMENTS

| | | | | | |
|---|---|---|---|---|---|
| CN | 114786983 | B | * | 10/2025 | F01P 11/10 |
| DE | 102018126453 | A1 | * | 5/2019 | B60K 11/04 |
| FR | 3100483 | A1 | * | 3/2021 | F04D 17/04 |
| FR | 3119569 | A1 | * | 8/2022 | F04D 29/4226 |
| FR | 3128901 | A1 | * | 5/2023 | B60K 11/04 |
| FR | 3139893 | A1 | * | 3/2024 | B60K 11/085 |
| JP | S591612 | U | | 1/1984 | |
| JP | H04100572 | U | | 8/1992 | |
| WO | 2021228495 | A1 | | 11/2021 | |

* cited by examiner

COOLING MODULE FOR AN ELECTRIC OR HYBRID MOTOR VEHICLE, HAVING A TANGENTIAL-FLOW TURBOMACHINE

TECHNICAL FIELD

The present invention relates to a cooling module for an electric or hybrid motor vehicle, having a tangential-flow turbomachine.

BACKGROUND OF THE INVENTION

A cooling module (or heat exchange module) of a motor vehicle conventionally comprises at least one heat exchanger and a ventilation device which is designed to generate an airflow in contact with the at least one heat exchanger. This ventilation device is for example a tangential-flow turbomachine. This for example enables generation of an airflow in contact with the heat exchanger when the vehicle is stationary or running at low speed.

Conventionally, the front face of the cooling module through which the airflow enters said module is arranged to face at least one cooling opening formed in the front face of the body of the motor vehicle, usually protected by a radiator grille.

However, electric vehicles are preferably provided only with cooling openings positioned below the bumper, since the electric motor does not need to be supplied with air. The motor vehicle can be provided with a single cooling opening positioned below the bumper, or need not comprise a cooling opening at all. More particularly, it is possible to conceive of an electric motor vehicle without a radiator grille.

The reduced number of cooling openings and the possible absence of a radiator grille on the front face of the vehicle help to improve the aerodynamic characteristics of the electric vehicle, inter alia. This also results in better range and a higher top speed of the motor vehicle. However, the absence of a radiator grille can impede the circulation of air in the cooling module, which can significantly reduce the performance levels thereof.

BRIEF SUMMARY OF THE INVENTION

The objective of the present invention is therefore to at least partially overcome the disadvantages of the prior art, and to propose an improved cooling module enabling an airflow to be circulated through the exchanger or exchangers, even in the absence of a radiator grille and/or a cooling opening in the motor vehicle.

The present invention thus concerns a cooling module for a motor vehicle having an electric or hybrid motor, said cooling module being intended to be traversed by an airflow circulating between an air inlet and an air outlet, the cooling module comprising a fairing forming an internal duct in a longitudinal direction of the cooling module that contains at least one heat exchanger intended to be traversed by the airflow, the fairing comprising a front face containing the air inlet arranged upstream of the at least one heat exchanger, the cooling module also comprising a collector housing positioned downstream of the fairing in the longitudinal direction, said collector housing being designed to receive a tangential-flow turbomachine, itself designed to generate the airflow to be discharged through the air outlet, the cooling module also comprising fastening elements arranged on both sides of the fairing, said fastening elements enabling the at least one heat exchanger to be fastened to the cooling module and enabling said module and the at least one heat exchanger to be fastened to a chassis of a motor vehicle such that the front face of the fairing faces an underbody of the motor vehicle.

The invention can also comprise one or more of the following aspects, considered in isolation or in combination:

- the fastening elements comprise at least one side bar fastened to each side wall of the fairing,
- said side bar is oriented perpendicular to the plane of the at least one heat exchanger,
- said at least one heat exchanger is fastened to said side bars,
- said side bars are also designed to be fastened to the chassis of the motor vehicle,
- the side bars are intended to be fastened directly to beams of the chassis on both sides of said cooling module,
- the fastening elements comprise a connecting part intended to connect the side bars and beams of the chassis on both sides of said cooling module,
- the air inlet is at least one suction opening formed in the front face of the fairing of the cooling module,
- the cooling module comprises at least one blocking device that is movable between a position opening and a position closing said at least one suction opening,
- the at least one blocking device comprises at least one pivoting flap that is designed to pivot about a pivot axis and to block the at least one suction opening,
- the cooling module comprises a control unit designed to control the blocking device,
- the control unit is designed to control each pivoting flap independently,
- the at least one blocking device comprises a plurality of pivoting flaps of different sizes, and
- in the open position, the at least one blocking device projects from the front face of the fairing to form an air deflector to divert the airflow entering the duct of the fairing through the at least one suction opening.

The invention also relates to a motor vehicle comprising such a cooling module. The invention can also comprise one or more of the following aspects, considered in isolation or in combination:

- when assembled, the longitudinal direction of the cooling module is contained within a plane generated by a vertical axis and a longitudinal axis of a trihedron associated with the motor vehicle,
- when assembled, the longitudinal direction of the cooling module is vertical, and
- the underbody is provided with at least one opening arranged to face the air inlet of the cooling module to enable an airflow to circulate from outside the motor vehicle into the cooling module.

BRIEF DESCRIPTION OF THE DRAWINGS

Further features and advantages of the present invention will become more clearly apparent from reading the following description, which is given by way of non-limiting illustration, and with reference to the accompanying drawings, in which.

DETAILED DESCRIPTION OF THE INVENTION

In the various figures, identical elements bear the same reference numbers.

The following embodiments are examples. Although the description refers to one or more embodiments, this does not necessarily mean that each reference relates to the same embodiment, or that the features apply only to a single embodiment. Simple features of different embodiments can also be combined and/or interchanged to provide other embodiments.

In the present description, certain elements or parameters can be indexed, for example first element or second element and also first parameter and second parameter or first criterion and second criterion, etc. In this case, this is simply indexing to differentiate and designate elements or parameters or criteria that are similar but not identical. Such indexing does not imply priority of one element, parameter or criterion over another, and such designations can be simply interchanged without thereby moving outside the scope of the present description. Neither does this indexing imply any chronological order for example in assessing any given criterion.

Figure 1:
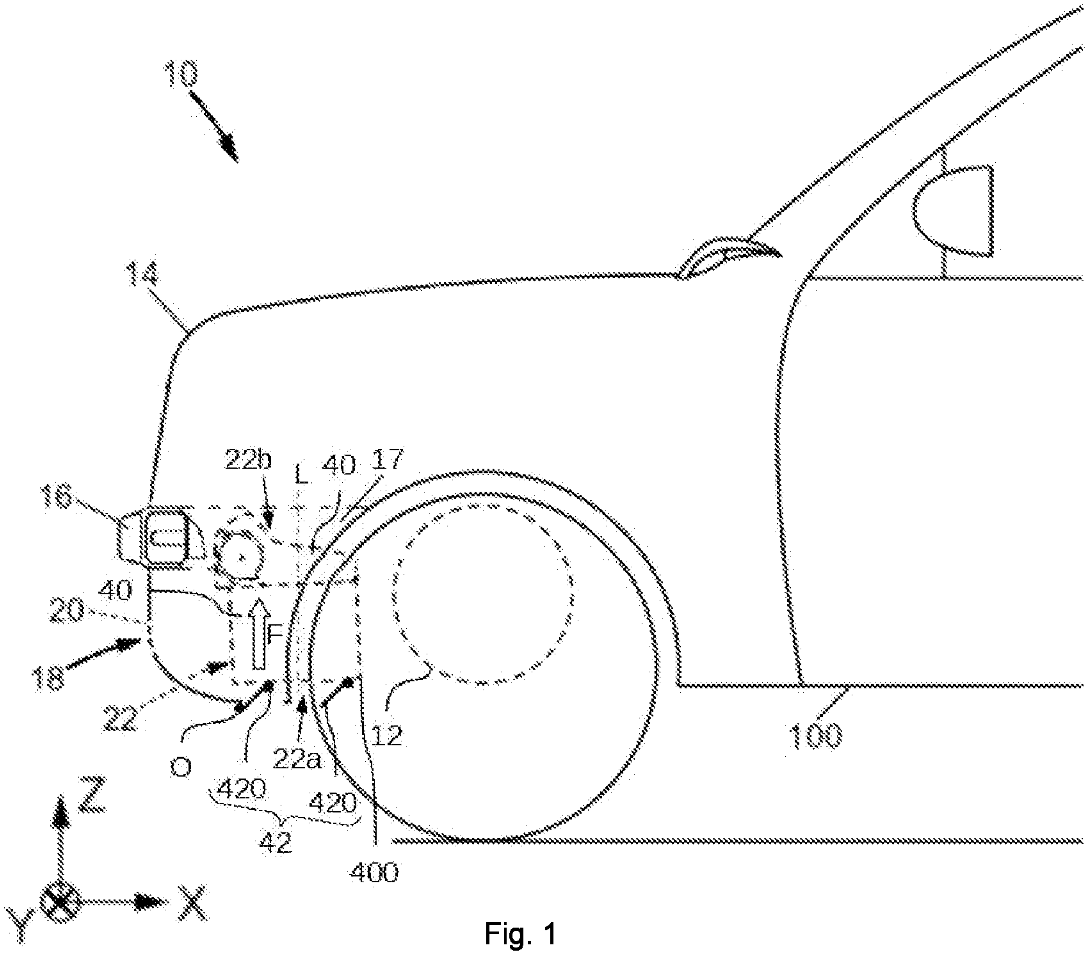
FIG. 1 is a partial schematic side view of the front of a motor vehicle.
Figure 2:
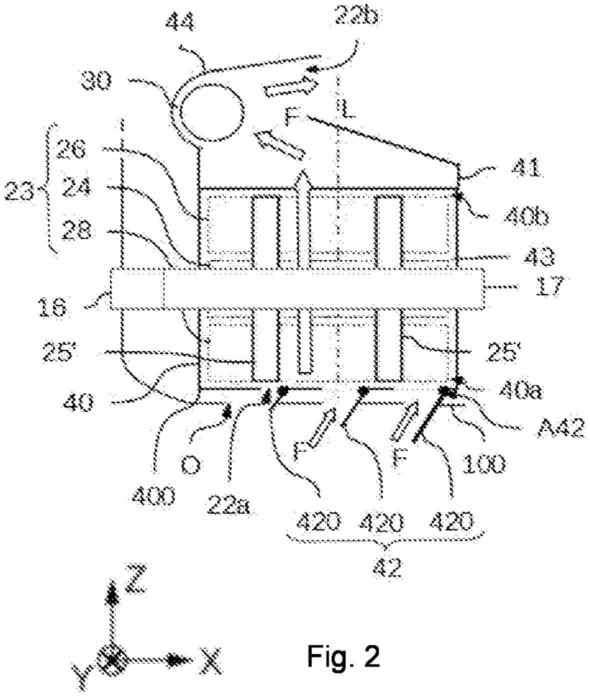
FIG. 2 is a detailed partial schematic side view of the front of a motor vehicle with a cooling module according to a first embodiment.
Figure 3:
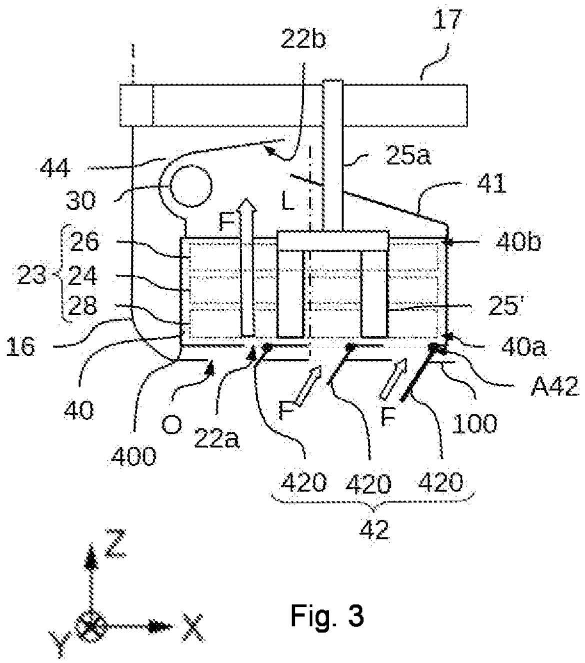
FIG. 3 is similar to FIG. 2 and shows a detailed partial schematic side view of the front of a motor vehicle with a cooling module according to a second embodiment.

FIGS. 1 to 3 show a trihedron XYZ to define the orientation of the various elements in relation to one another. A first direction, denoted X, corresponds to a longitudinal direction of the vehicle. It also corresponds to a direction opposite to the direction of forward travel of the vehicle. A second direction, denoted Y, is a lateral or transverse direction. Finally, a third direction, denoted Z, is vertical. The directions X, Y, Z are orthogonal in pairs.

In all of the figures, the cooling module according to the present invention is illustrated in a functional position, i.e. when it is positioned within a motor vehicle.

FIG. 1 schematically illustrates the front of an electric or hybrid motor vehicle 10 which can comprise an electric or hybrid motor 12. The vehicle 10 notably comprises a body 14 and a bumper 16 which are supported by a chassis 17 (shown in part in FIG. 1) of the motor vehicle 10. A cooling module 22 is positioned behind the bumper 16 and facing the underbody 100 of the motor vehicle 10. The body 14 optionally can define a cooling opening 18, that is, an opening through the body 14. A radiator grille 20 can optionally protect this cooling module 22.

The cooling module 22 is intended to be traversed by an airflow F (shown by an arrow in FIG. 1) circulating from an air inlet 22*a* to an air outlet 22*b* in a longitudinal direction L of the cooling module 22. In the present application, an element that is positioned closer to the air inlet 22*a* or closer to the air outlet 22*b* than another element in the longitudinal direction L of the cooling module 22 is referred to respectively as being "upstream" or "downstream".

Similarly, "upper" and "lower" or "above" and "below" relate to an orientation in the direction Z of the trihedron XYZ associated with the motor vehicle 10. An upper element or an element above another element will be closer to the roof of the vehicle 10, while a lower element or an element below another element will be closer to the underbody 100.

According to this convention, a front face 400 comprising the air inlet 22*a* through which the airflow F is intended to enter said module 22 is arranged to face the underbody 100 of the motor vehicle 10, while the rear face comprising the air outlet 22*b* through which the airflow F is intended to exit the cooling module 22 is positioned above the front face 400. The front face 400 and the rear face are for example oriented perpendicular to the vertical axis Z of the trihedron XYZ.

The underbody 100 is provided with at least one opening O arranged to face the air inlet 22*a* of the cooling module 22 to enable an airflow F to circulate from outside the motor vehicle 10 into the cooling module 22. Providing an opening O in the underbody 100 of the motor vehicle 10 more specifically enables the air available in this location to be used to generate the airflow F intended to traverse the cooling module 22 without having to alter the body 14 of the vehicle 10.

The cooling module 22 essentially comprises a fairing 40 forming an internal duct containing at least one heat exchanger 24, 26, 28, as shown more specifically in FIG. 2. The front face 400 thus serves as a base for the fairing 40 and the air inlet 22*a* is then positioned upstream of the at least one heat exchanger 24, 26, 28. The internal duct extends between an upstream end 40*a* and a downstream end 40*b* that are opposite one another, the upstream end 40*a* being oriented towards the underbody 100 of the vehicle 10.

According to a specific embodiment of the cooling module 22, the cooling module has at least two heat exchangers 24, 26, 28 stacked in the internal duct in the longitudinal direction L of said module. In FIG. 2, the cooling module 22 comprises three heat exchangers 24, 26, 28 grouped together within a heat exchanger assembly 23. However, it could comprise more or fewer depending on the desired configuration.

A first heat exchanger 24 can for example be designed to release heat energy from the airflow F. This first heat exchanger 24 can more specifically be a condenser connected to a cooling circuit (not shown), for example to cool the batteries of the vehicle 10. This cooling circuit can for example be an air-conditioning circuit able to cool the batteries and an internal airflow destined for the motor vehicle interior.

A second heat exchanger 26 can also be designed to release heat energy into the airflow F. This second heat exchanger 26 can more specifically be a radiator connected to a thermal management circuit (not shown) for electrical elements, such as the electric motor 12.

Since the first heat exchanger 24 is generally a condenser of an air-conditioning circuit, the latter needs the airflow F to be as "cool" as possible in air-conditioning mode. For this purpose, the second heat exchanger 26 is preferably positioned downstream of the first heat exchanger 24 in the direction of circulation of the airflow F. It is nevertheless entirely conceivable for the second heat exchanger 26 to be positioned upstream of the first heat exchanger 24.

The third heat exchanger 28 can itself also be configured to release heat energy into the airflow. This third heat exchanger 28 can more particularly be a radiator connected to a thermal management circuit (not shown), which can be separate from the one connected to the second heat exchanger 26, for electrical elements such as the power electronics. It is also entirely conceivable for the second 26 and the third 28 heat exchangers to be connected to a single thermal management circuit, for example connected in parallel with one another.

Again according to the example illustrated in FIG. 2, the second heat exchanger 26 is positioned above the first heat exchanger 24, whereas the third heat exchanger 28 is positioned below the first heat exchanger 24. Other configurations can nevertheless be envisaged, such as, for example, the second heat exchanger 26 and the third heat exchanger 28 being positioned both above or both below the first heat exchanger 24.

In the embodiment illustrated in the same figure, each of the heat exchangers 24, 26, 28 has a generally parallelepiped form determined by a width, a thickness and a height. The width extends in the direction Y, the thickness extends in the direction Z, and the height extends in the direction X. The heat exchangers 24, 26, 28 thus extend in a general plane perpendicular to the vertical direction Z. The heat exchangers 24, 26, 28 are therefore perpendicular to the airflow F intended to pass therethrough.

The form of the at least one heat exchanger 24, 26, 28 also determines the overall forms of the fairing 40 and of the internal duct formed thereby. The fairing 40 for example has four junction walls delimiting an internal duct of square or rectangular cross section. According to embodiments not shown in the figures, the internal duct of the fairing 40 and the collector housing 41 can have a cross section that is not a quadrilateral. This cross section can notably be hexagonal (in which case the fairing 40 comprises six junction walls), octagonal (in which case the fairing 40 comprises eight junction walls), or circular (in which case the fairing 40 and the housing are cylindrical and comprise a single side wall forming the casing of the cylinder). The cross section of the internal duct of the fairing 40 therefore depends mainly on the geometry of the at least one heat exchanger 24, 26, 28 arranged therein.

The cooling module 22 also comprises a collector housing 41 which is positioned above the fairing 40 and the assembly 23 of heat exchangers 24, 26, 28. More specifically, the collector housing 41 is arranged beside the downstream end 40*b* of the fairing 40, and is thus aligned with the fairing 40 along the longitudinal axis X of the cooling module 22. This collector housing 41 comprises the air outlet 22*b* intended to deliver the airflow F. The collector housing 41 thus makes it possible to recover the airflow F passing through the heat exchanger assembly 23 and to orient this airflow F towards the air outlet 22*b*. This is illustrated in particular by the arrows representing the airflow F in FIG. 2. The collector housing 41 can be integral with the fairing 40 or it can be an added-on part fastened to the downstream end 40*b* of said fairing 40.

The cooling module 22, and more specifically the collector housing 41, also comprises at least one tangential-flow fan, also known as a tangential-flow turbomachine 30. The tangential-flow turbomachine is designed to aspirate air to generate the airflow F passing through the heat exchanger assembly 23. The tangential-flow turbomachine 30 comprises more specifically a volute 44, formed by the first collector housing 41 with a turbine arranged at the center. The volute 44 at least partially delimits the air outlet 22*b* of the airflow. In other words, the discharge of air from the volute 44 corresponds to the air outlet 22*b* of the airflow F from the collector housing 41.

In the example shown in FIG. 2, the tangential-flow turbomachine 30 is in a position bringing said turbomachine closer to the front face of the motor vehicle 10. In this specific case, the air outlet 22*b* of the airflow F is preferably oriented towards the rear of the motor vehicle 10 so that the airflow is discharged through the air outlet 22*b* in a direction substantially parallel to the axis X.

Other positions of the tangential-flow turbomachine 30 within the collector housing 41 are nonetheless possible. Said turbomachine can for example be arranged such that the air outlet 22*b* of the airflow is oriented towards the front face of the motor vehicle 10. Alternatively, the tangential-flow turbomachine 30 can be positioned in the middle of the rear face of the collector housing 41, for example to integrate the cooling module 22 into the surrounding area. These alternatives are not illustrated.

The cooling module 22 further comprises fastening elements 25 for fastening said module 22 to the chassis 17 of the motor vehicle 10. These fastening elements 25 are designed to enable the cooling module 22 to be positioned in relation to the chassis 17 of the motor vehicle 10 such that the front face 400 of the fairing 40 faces an underbody 100 of the motor vehicle 10. These fastening elements 25 are arranged on both sides of the fairing 40 and are also designed to fasten the at least one heat exchanger 24, 26, 28 to the cooling module 22. The fastening elements 25 also enable said module 22 and said at least one heat exchanger 24, 26, 28 to be fastened to the chassis 17 of the motor vehicle 10. Where the cooling module 22 has several heat exchangers 24, 26, 28, the fastening elements 25 also enable the assembly 23 of heat exchangers 24, 26, 28 to be positioned statically in relation to one another, for example by elements of an aligned stack of said heat exchangers 24, 26, 28 inside the fairing 40.

According to a first embodiment of the fastening elements 25, said fastening elements comprise at least one side bar 25' (shown in FIG. 2) fastened to each side wall 43 of the fairing 40 of the cooling module 22. The at least one side bar 25' is notably oriented perpendicular to the plane of the at least one heat exchanger 24, 26, 28 and said at least one heat exchanger 24, 26, 28 is fastened to said at least one side bar 25'. In other words, the side bar or bars 25' act as fastening supports for the at least one exchanger 24, 26, 28 to hold said exchanger in place in the duct formed by the fairing 40. Furthermore, the side bar or bars 25' are designed to be fastened to the chassis 17 of the motor vehicle 10. The number of side bars 25' is for example between two (one on each side of the cooling module 22) and six (three on each side of the cooling module 22). In the example shown in FIG. 2, two of the four side bars 25' in this variant of the cooling module 22 are shown.

The side bar or bars 25' and the fastening elements 25 more generally enable the assembly 23 of exchangers 24, 26, 28 to be positioned in relation to one another and fastened to the module 22, since the specific orientation of said module 22 in the vehicle 10 does not enable said module 22 and the assembly 23 of exchangers 24, 26, 28 housed therein to be fastened directly to the chassis 17 of the vehicle 10. Since the assembly 23 of exchangers 24, 26, 28 is no longer oriented perpendicular to the beam of the chassis 17, but stacked parallel to said beam, fastening the at least one exchanger 24, 26, 28 requires reliable fastening elements 25 that enable the cooling module 22 and the content thereof to be held in this specific orientation.

The side bars 25' are for example intended to be fastened directly to the beams of the chassis 17 on both sides of said cooling module 22. According to a variant of this embodiment of the fastening elements 25, said fastening elements comprise a connecting part 25*a* intended to connect the side bars 25' and the beams of the chassis 17 on both sides of the cooling module 22, as shown notably in FIG. 3. One such connecting part 25*a* can help to hold the cooling module 22 and the components thereof on the beam of the chassis 17, notably where the fairing 40 containing the assembly 23 of heat exchangers 24, 26, 28 is not at the same height as the beam of the chassis 17. The connecting part 25*a* can be integral with the side bars 25'.

Returning to the example in FIG. 1 showing the cooling module 22 assembled in the motor vehicle 10, the longitudinal direction L of the cooling module 22 when assembled can be contained in a plane generated by the vertical axis Z and a longitudinal axis of the motor vehicle 10, this axis being parallel to the direction X. According to a specific assembly, the longitudinal direction L of the cooling module 22 is vertical, i.e. parallel to the direction Z.

One or more embodiments in which the cooling module 22 is inclined in relation to the direction Z are also possible. An angle of inclination between the longitudinal direction L of the cooling module 22 and the vertical direction Z can thus be defined, said angle of inclination being for example between 5° and 45°. These alternative inclinations are not shown in the figures.

In any case, the air inlet 22*a* of the cooling module 22 is arranged to face the underbody 100 of the motor vehicle 10. The air inlet 22*a* can be at least one suction opening O in the front face 400 of the fairing 40 of the cooling module 22. The at least one suction opening O is positioned upstream of the heat exchanger 24 beside the upstream end 40*a*. The number of suction openings O forming the air inlet 22*a* can be between one and ten. The suction openings O are for example distributed evenly over the front face 400. In the embodiment shown in FIG. 2, there are three suction openings O.

The cooling module 22 can further comprise at least one blocking device 42 that is movable between a position opening and a position closing said at least one suction opening O. The at least one blocking device 42 comprises at least one pivoting flap 420 that is designed to pivot about a pivot axis A42. This at least one pivoting flap 420 is then intended to block the at least one suction opening O. There can notably be one pivoting flap 420 per suction opening O. The pivoting flap or flaps 420 can be butterfly flaps or flag flaps.

More specifically, an embodiment in which the at least one blocking device 42 has a plurality of pivoting flaps 420 of different sizes is possible. More specifically, the pivoting flaps 420 increase in size in the direction X indicated throughout the figures, as shown notably in FIG. 2. Thus, the pivoting flap 420 closest to the bumper 16 of the motor vehicle 10 is the smallest of the set of pivoting flaps forming the blocking device 42, while the pivoting flap 420 furthest away from the bumper 16 is the largest, as shown more specifically in FIG. 2. The variable size of the pivoting flaps 420 can help to better regulate the airflow F entering the cooling module 22 through the air inlet 22*a*.

In addition, the cooling module 22 can comprise a control unit (not shown in the figures) configured to control the blocking device 42. The control unit can be configured to position and immobilize the blocking device 42 in at least one intermediate position when said blocking device 42 is moving between the open and closed positions. In the open position, the at least one blocking device 42 can project from the front face 400 of the fairing 40 to form an air deflector intended to divert the airflow F entering the duct in the fairing 40 through the at least one suction opening O.

The angle of inclination of the pivoting flaps 420 also enables regulation of the airflow F entering the cooling module 22 through the air inlet 22*a* formed by the suction opening or openings O in the front face 400 of the fairing 40. Thus, the airflow F circulating through the heat exchanger or exchangers 24, 26, 28 can be adjusted according to the performance levels required from said heat exchangers 24, 26, 28.

In addition, the control unit can be configured to control each pivoting flap 420 independently. Arrangements in which one or more pivoting flaps 420 block the suction opening O to which said flaps are attached, while other pivoting flaps 420 adopt an open position or an intermediate position, thus influencing the quantity of air passing through the suction opening or openings O, are thus possible.

The edges of the at least one suction opening O which are intended to come into contact with the edge or edges of the blocking device 42 can have one or more seals. The seal or seals can absorb the shock of the impact of the edges of the blocking device 42 on the edge or edges of the at least one suction opening O when the blocking device 42 begins to move to the closed position. This seal or these seals can be produced by overmolding of the edge or edges of the at least one suction opening O. Alternatively, the seal or seals can be added-on parts. In addition, the edge or edges of the blocking device 42 can also comprise at least one seal. This at least one seal can be produced by overmolding, or can be an added-on part.

The invention is not limited to the exemplary embodiments described with reference to the figures, and further embodiments will be clearly apparent to persons skilled in the art. In particular, the various examples can be combined, provided they are not contradictory.

What is claimed is:

1. A cooling module for a motor vehicle having an electric or hybrid motor, said cooling module comprising:

an air inlet and an air outlet, with the cooling module being intended to be traversed by an airflow circulating between the air inlet and the air outlet, a fairing forming an internal duct in a longitudinal direction of the cooling module that contains at least one heat exchanger intended to be traversed by the airflow, the fairing including a front face containing the air inlet arranged upstream of the at least one heat exchanger, a collector housing positioned downstream of the fairing in the longitudinal direction, said collector housing being designed to receive a tangential-flow turbomachine designed to generate the airflow to be discharged through the air outlet;

fastening elements arranged on both sides of the fairing, said fastening elements enabling the at least one heat exchanger to be fastened to the cooling module and enabling said module and the at least one heat exchanger to be fastened to a chassis of a motor vehicle such that the front face of the fairing faces an underbody of the motor vehicle; and at least one blocking device projecting from the front face of the fairing and comprising a plurality of pivoting flaps designed to pivot about a respective axis.

2. The cooling module according to claim 1, wherein the fastening elements include at least one side bar fastened to each side wall of the fairing, said side bars being oriented perpendicular to the plane of the at least one heat exchanger, said at least one heat exchanger being fastened to said side bars, said side bars also being designed to be fastened to the chassis of the motor vehicle.

3. The cooling module according to claim 2, wherein the side bars are intended to be fastened directly to beams of the chassis on both sides of said cooling module.

4. The cooling module according to claim 2, wherein the fastening elements include a connecting part intended to connect the side bars and beams of the chassis on both sides of said cooling module.

5. The cooling module according to claim 1, wherein the air inlet is at least one suction opening formed in the front face of the fairing of the cooling module.

6. The cooling module according to claim 5, wherein the at least one blocking device includes at least one pivoting flap that is designed to pivot about a pivot axis and to block the at least one suction opening.

7. The cooling module according to claim 5, further comprising a control unit designed to control the at least one blocking device.

8. The cooling module according to claim 1, wherein the pivoting flaps increase in size along a direction (X) of the vehicle away from a front bumper of the motor vehicle, such that the pivoting flap closest to the front bumper is the smallest and the pivoting flap furthest from the front bumper is the largest.

9. The cooling module according to claim 1, wherein, when in the open position, the pivoting flaps project outwardly from the front face of the fairing to form an air deflector configured to catch and scoop underbody airflow moving beneath the vehicle and divert said airflow into the internal duct through the suction openings.

10. A motor vehicle comprising an underbody and a cooling module including:

an air inlet and an air outlet, with the cooling module being intended to be traversed by an airflow circulating between the air inlet and the air outlet, a fairing forming an internal duct in a longitudinal direction of the cooling module that contains at least one heat exchanger intended to be traversed by the airflow, the fairing including a front face containing the air inlet arranged upstream of the at least one heat exchanger, a collector housing positioned downstream of the fairing in the longitudinal direction, said collector housing being designed to receive a tangential-flow turbomachine designed to generate the airflow to be discharged through the air outlet;

fastening elements arranged on both sides of the fairing, said fastening elements enabling the at least one heat exchanger to be fastened to the cooling module and enabling said module and the at least one heat exchanger to be fastened to a chassis of a motor vehicle such that the front face of the fairing faces the underbody of the motor vehicle;

at least one blocking device projecting from the front face of the fairing and comprising a plurality of pivoting flaps designed to pivot about a respective pivot axis;

wherein, when assembled, the longitudinal direction of the cooling module is contained within a plane generated by a vertical axis and a longitudinal axis of a trihedron associated with the motor vehicle.

11. The motor vehicle according to claim 10, wherein, when assembled, the longitudinal direction of the cooling module is vertical.

12. The motor vehicle according to claim 10, wherein the underbody is provided with at least one underbody opening arranged to face the air inlet of the cooling module to enable an airflow to circulate from outside the motor vehicle into the cooling module.

13. The cooling module according to claim 10, wherein the pivoting flaps increase in size along a direction (X) of the vehicle away from a front bumper of the motor vehicle, such that the pivoting flap closest to the front bumper is the smallest and the pivoting flap furthest from the front bumper is the largest.

14. The cooling module according to claim 10, wherein, when in the open position, the pivoting flaps project outwardly from the front face of the fairing to form an air deflector configured to catch and scoop underbody airflow moving beneath the vehicle and divert said airflow into the internal duct through the suction openings.

15. A cooling module for a motor vehicle having an electric or hybrid motor, said cooling module comprising:

an air inlet and an air outlet, with the cooling module being intended to be traversed by an airflow circulating between the air inlet and the air outlet, a fairing forming an internal duct that contains at least one heat exchanger intended to be traversed by the airflow, the fairing including a front face containing the air inlet arranged upstream of the at least one heat exchanger, fastening elements arranged on both sides of the fairing, said fastening elements enabling the at least one heat exchanger to be fastened to the cooling module and enabling said module and the at least one heat exchanger to be fastened to a chassis of a motor vehicle such that the front face of the fairing faces an underbody of the motor vehicle; and at least one blocking device comprising a plurality of pivoting flaps of different sizes designed to pivot about a respective pivot axis.

16. The cooling module according to claim 15, wherein the at least one blocking device projects from the front face of the fairing.

17. The cooling module according to claim 15, wherein the pivoting flaps increase in size along a direction (X) of the vehicle away from a front bumper of the motor vehicle, such that the pivoting flap closest to the front bumper is the smallest and the pivoting flap furthest from the front bumper is the largest.

18. The cooling module according to claim 15, wherein, when in the open position, the pivoting flaps project outwardly from the front face of the fairing to form an air deflector configured to catch and scoop underbody airflow moving beneath the vehicle and divert said airflow into the internal duct through the suction openings.

19. The cooling module according to claim 15, wherein the internal duct extends in a longitudinal direction of the cooling module that is vertical.

20. The cooling module according to claim 19, further comprising:

a collector housing positioned downstream of the fairing in the longitudinal direction, the collector housing being designed to receive a tangential-flow turbomachine designed to generate the airflow to be discharged through the air outlet.

* * * * *